(12) United States Patent
Muse et al.

(10) Patent No.: US 9,147,202 B1
(45) Date of Patent: Sep. 29, 2015

(54) SYSTEM AND METHOD OF DIRECT MARKETING BASED ON EXPLICIT OR IMPLIED ASSOCIATION WITH LOCATION DERIVED FROM SOCIAL MEDIA CONTENT

(75) Inventors: Michael Muse, New York, NY (US); Nihal Mehta, New York, NY (US)

(73) Assignee: LocalResponse, Inc., New York, NY (US)

( * ) Notice: Subject to any disclaimer, the term of this patent is extended or adjusted under 35 U.S.C. 154(b) by 289 days.

(21) Appl. No.: 13/600,472

(22) Filed: Aug. 31, 2012

Related U.S. Application Data

(60) Provisional application No. 61/530,224, filed on Sep. 1, 2011.

(51) Int. Cl.
*G06Q 30/02* (2012.01)

(52) U.S. Cl.
CPC ........ *G06Q 30/0261* (2013.01); *G06Q 30/0201* (2013.01); *G06Q 30/0205* (2013.01); *G06Q 30/0207* (2013.01); *G06Q 30/0212* (2013.01); *G06Q 30/0241* (2013.01); *G06Q 30/0251* (2013.01); *G06Q 30/0277* (2013.01)

(58) Field of Classification Search
CPC .............. G06Q 30/02; G06Q 30/0201; G06Q 30/0207; G06Q 30/0205; G06Q 30/0212; G06Q 30/0241; G06Q 30/0251; G06Q 30/0261; G06Q 30/0277
USPC ............. 705/7.11, 7.29, 14.64; 709/217, 218, 709/219; 726/7; 386/343
See application file for complete search history.

(56) References Cited

U.S. PATENT DOCUMENTS

| | | | |
|---|---|---|---|
| 7,593,740 | B2 | 9/2009 | Crowley et al. |
| 2004/0088325 | A1 | 5/2004 | Elder et al. |
| 2006/0085419 | A1 | 4/2006 | Rosen |
| 2008/0086458 | A1 | 4/2008 | Robinson et al. |
| 2008/0092182 | A1* | 4/2008 | Conant .......................... 725/109 |
| 2008/0133336 | A1 | 6/2008 | Altman et al. |

(Continued)

OTHER PUBLICATIONS

Davis et al., From Content to Content: Leveraging Context to Infer Media Metadata, Multimedia '04, Proceedings of the 12th annual ACM international conference on Multimedia, 2004, pp. 188-195, New York, NY.

(Continued)

*Primary Examiner* — Le H Luu
(74) *Attorney, Agent, or Firm* — Clock Tower Law Group; Erik J. Heels; Michael A. Bartley

(57) ABSTRACT

A system and method delivers marketing messages based on location specific check-ins. This permits highly targeted communications directed at first entities such as persons, organizations, or businesses who are patrons of second entity locations which are typically businesses. Selection of first entities is based on detection of past or potential patronage of second entities through social media or other public digital content check-ins. Check-ins are analyzed to identify any second entity referred to and associating such reference to the author of the content. Second entities, such as a merchant or brand, may be explicitly determined from meta-data of source content, or implicitly through processing such as natural language analysis or association through a third entity. Second entities use such connections to deliver targeted marketing messages through a public social media profile of the first entity. Analytics may be used to track of check-in patterns and effectiveness of marketing campaigns.

19 Claims, 10 Drawing Sheets

(56) References Cited

U.S. PATENT DOCUMENTS

| | | | |
|---|---|---|---|
| 2008/0195664 A1* | 8/2008 | Maharajh et al. | 707/104.1 |
| 2009/0299990 A1 | 12/2009 | Setlur et al. | |
| 2010/0030715 A1 | 2/2010 | Eustice et al. | |
| 2010/0057772 A1 | 3/2010 | Manolescu et al. | |
| 2010/0103463 A1 | 4/2010 | Joshi et al. | |
| 2010/0106801 A1 | 4/2010 | Bliss et al. | |
| 2010/0191827 A1* | 7/2010 | Martin | |
| 2010/0205176 A1 | 8/2010 | Ji et al. | |
| 2011/0038470 A1* | 2/2011 | Kent | 379/142.04 |
| 2011/0196888 A1* | 8/2011 | Hanson et al. | 707/769 |
| 2011/0258049 A1* | 10/2011 | Ramer et al. | 705/14.66 |
| 2012/0054180 A1* | 3/2012 | Priyadarshan et al. | 707/731 |
| 2012/0192239 A1* | 7/2012 | Harwell et al. | 725/109 |
| 2012/0210233 A1* | 8/2012 | Davis et al. | 715/727 |
| 2012/0224743 A1* | 9/2012 | Rodriguez et al. | 382/103 |
| 2012/0233531 A1* | 9/2012 | Ma et al. | 715/205 |
| 2013/0013414 A1* | 1/2013 | Haff | 705/14.64 |
| 2013/0055088 A1* | 2/2013 | Liao et al. | 715/730 |
| 2013/0064527 A1* | 3/2013 | Maharajh et al. | 386/343 |
| 2013/0073336 A1* | 3/2013 | Heath | 705/7.29 |
| 2013/0110565 A1* | 5/2013 | Means et al. | 705/7.11 |
| 2013/0291079 A1* | 10/2013 | Lowe et al. | 726/7 |

OTHER PUBLICATIONS

Gallagher et al., Geo-location Inference from Image Content and User Tags, IEEE Computer Society Conference on Computer Vision and Pattern Recognition Workshops, Jun. 2009, pp. 55-62, Miami, FL.

Lane et al., Cooperative Techniques Supporting Sensor-based People-centric Inferencing, Proceedings of the 6th International Conference on Pervasive Computing, May 2008, pp. 75-92, Sydney, Australia.

* cited by examiner

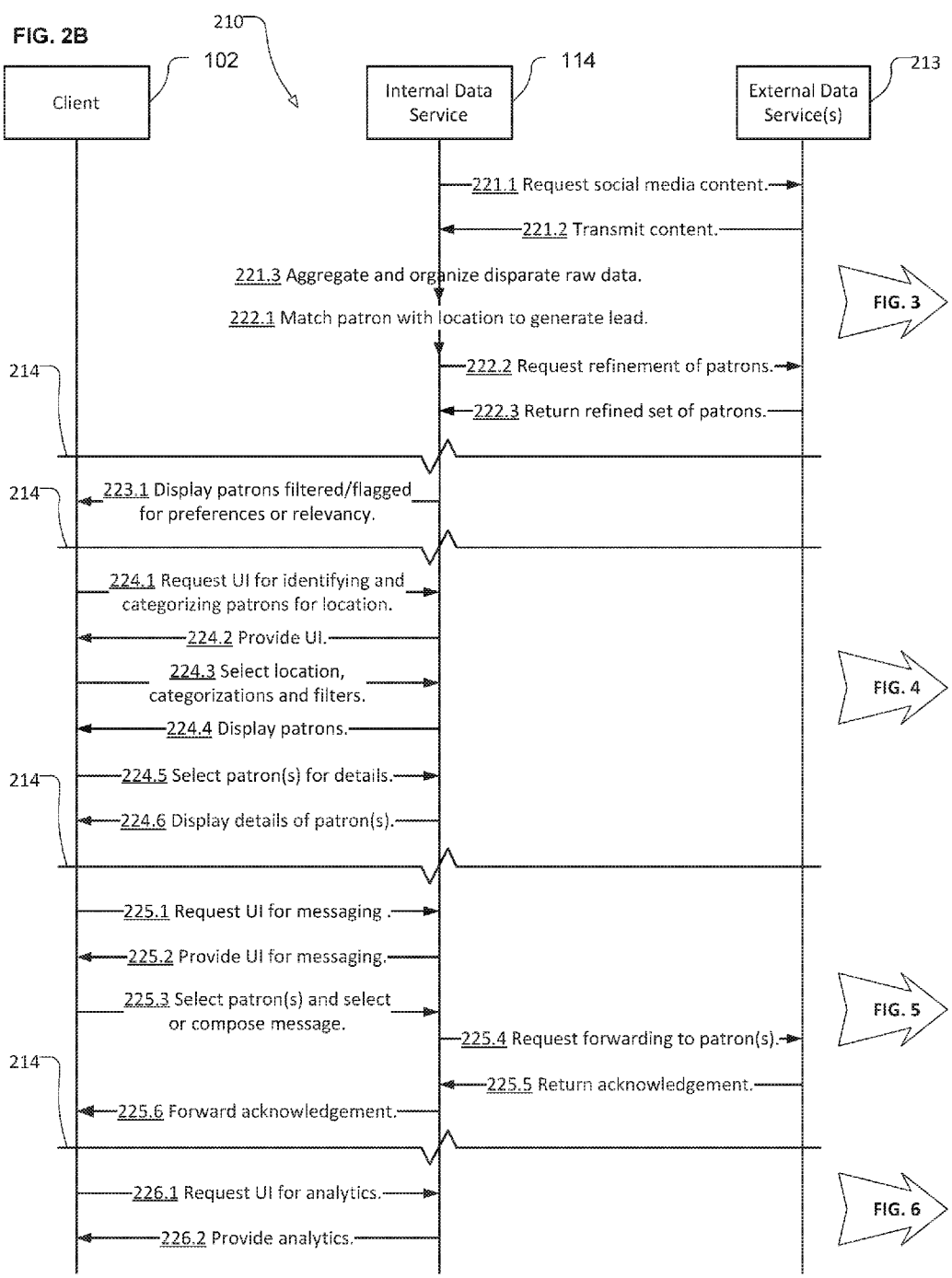

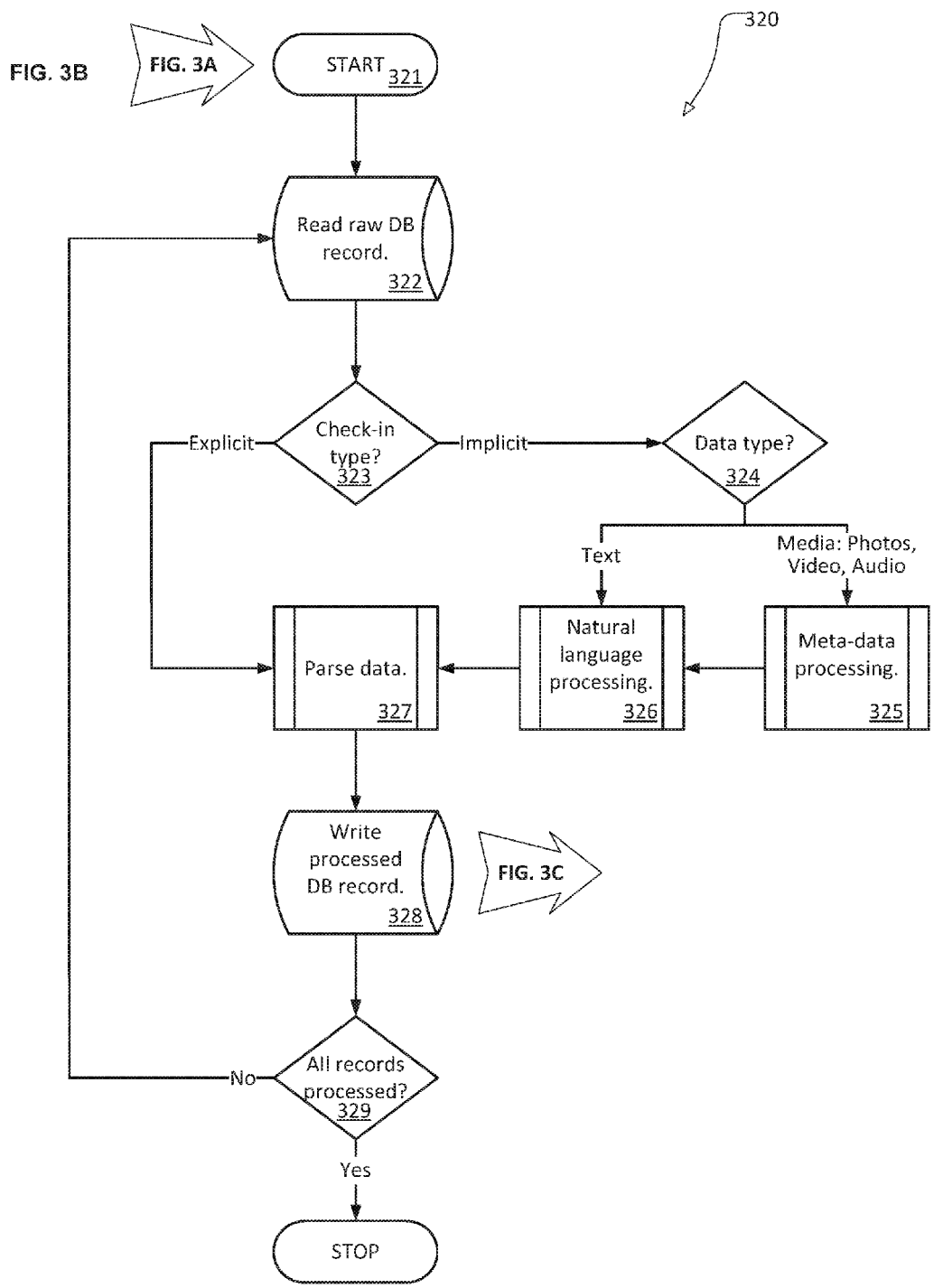

SYSTEM AND METHOD OF DIRECT MARKETING BASED ON EXPLICIT OR IMPLIED ASSOCIATION WITH LOCATION DERIVED FROM SOCIAL MEDIA CONTENT

CROSS-REFERENCE TO RELATED APPLICATIONS

This utility patent application claims priority from U.S. provisional patent application Ser. No. 61/530,224, filed Sep. 1, 2011, titled "SYSTEM AND METHOD OF DIRECT MARKETING BASED ON EXPLICIT OR IMPLIED ASSOCIATION WITH LOCATION DERIVED FROM SOCIAL MEDIA CONTENT" in the name of Michael Muse and Nihal Mehta.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2012 LocalResponse, Inc.

BACKGROUND

1. Technological Field

This disclosure is related to social media marketing based on location detection, and more specifically integrates all means of location extraction from accessible social media online content, associations between separated online social media services to better determine location, and provides that location's administrator information in selectable fashion to use in location-specific patron identification and direct communication.

2. Background

The present invention is closely tied to social media and mobile devices. Social media, mobile devices and their interrelation are thus described in the following order.

Social Media and Mobile Devices

The term social media refers to the use of web-based and mobile technologies for social communications. In concrete terms, social media is user-generated digital content about people, businesses or any topic produced as an artifact of social interaction using ubiquitously accessible and scalable communication techniques, most notably Internet connected personal computers (desktops or portables) and mobile devise, in particular smartphones. By its very nature, social media digital content is public to varying degrees. At minimum, it is public to an audience selected by the content author, at widest it is open to the general public. Social media has been widely adopted by the general public since web-based applications and services started to appear in the early 2000s. Mobile devices, smartphones in particular, have also gained wide pubic adoption. Social media and smartphones have co-evolved and are closely related. Social media relies on the communications aspect of smart phones and one of the most common applications of smartphones is social media.

Forms of Social Media

Social media can take on many different forms. Although there is considerable overlap, these forms can be generally categorized into the following groups; social networking; geolocation; media sharing such as photos, videos and presentations; social bookmarking; blogs; wikis; file sharing; and event planning.

Networking Form of Social Media

Social networking services allow users to add friends, send messages and share content. Popular services for social networking include Google+, Facebook, LinkedIn and Twitter. The last may also be considered to be a "micro" blog and is popular with mobile device users. These services may be for general use or optimized for a narrower scope such as business and career related networking. People on social networking services group in communities of like-minded interest. Social networking may be considered the basis of all other types of social media; the other types also allow for networking though they are typically specialized in sharing certain content types such as one's geographical location. Smartphones, carried by a person at any given time, facilitate timely remote social networking.

Geolocation Form of Social Media

Geolocation services such as Gowalla, Foursquare and Yelp feature "check-in" capabilities. A check-in is a process where users can, if they choose, share their location—usually at the immediate present—and comments about it with their social connections. Examples of location types to which check-ins commonly occur are public destinations such as restaurants, bars, retail shops, clubs, parks, stadiums, museums, tourist attractions and various types of entertainment venues. Where supported, capabilities such as geocoding and geotagging are used to enrich social dynamics and networking. User-submitted location data or geolocation techniques allow social networks to connect and coordinate users with others for events matching their interests. Geolocation on web-based social network services is often IP-based. Gelocation services are closely allied with mobile devices and Global Positioning System (GPS) commonly imbedded in mobile devices, smartphones in particular, make location-based services easier to use by applying user coordinates at the time of check-in while at a location of interest. Smartphones are appealing in that they allow more timely and convenient check-ins.

Media Sharing Form of Social Media

Media sharing includes subcategories of photo, video and audio sharing. Photo sharing sites, in particular, are where people can upload photos to share either privately with select users. Examples of popular services include Flickr, Photobucket and Instagram. These services allow users to describe their photographs with keyword tags or describe them in detail. Longitude and latitude coordinates imbedded into meta-data of photographs taken using devices equipped with GPS, such as most modern smartphones may allow easier identification of locations where photo was taken. The coordinates can be linked to such services such as Google Maps.

BRIEF SUMMARY

The disclosed systems and methods improve currently existing geolocation social media as the latter does not exploit applicable data from other forms of social media. For example, blogs, discussions or "tweets" at various other forms of social media services not specifically geolocation oriented can serve as a type of "implicit" check-in where location can be extrapolated from key word and semantic analysis of content in real time or asynchronously from user generated text content. Additionally, check-in data may be extracted from other forms of media. For example, GPS coordinates imbedded into meta-data of photographs can also become a source of "implicit" check-in data. In contrast, Gowalla, Foursquare and other geolocation social media rely exclusively on "explicit" check-ins where a location must be specified from an already existing list or be added prior to checking-in which many users are unwilling to perform. Thus immense, untapped data from non-geolocation social media can provide a much larger data set which merchants (and even regional, national or international commercial brands not directly linked to one particular geographical location) can turn implied presence of a uniquely identifiable patron at a unique location into valuable marketing transactions.

The disclosed systems and methods utilize that refined data in a useful manner by providing a means to selectively direct marketing messages to social media users who have checked-in to a location having accurately identified those users. This is in contrast to mass marketing or broadcasting techniques of prior art which have low efficiency.

The disclosed systems and methods combine technologies to extract value out of the inherent noise in social media and apply that value to targeted marketing.

To establish consistent terminology of use case actors, distinction is made between patrons and locations. Patrons may be persons, organizations or businesses. These may be considered visitors or customers of locations, or potential visitors or customers. Patrons are social media content authors or are referenced by or associated with the social media content. Locations may be persons, geographic locations, organizations, businesses, and brands. In preferred embodiments within this disclosure, they are conventionally businesses, either geographically fixed merchants or borderless brands, wishing a targeted marketing campaign aimed at patrons. In some cases, locations may be organizations or other entities reaching out to patrons on a targeted individual basis. Location administrator is typically a proprietor or someone authorized for marketing purposes to act for the location.

Systems and methods may be categorized in the following manner:
1. Collection and Refinement of Check-Ins. Social media user and a location are linked for purposes of identifying the user as a patron of that location.
2. Patron Management. Patrons pertaining to a location are displayed for further actions such as selection for messaging.
3. Marketing Message and Analytics. This pertains to contacting the patron though means provided by the social media service from which check-in was derived and examining patron behavior such as in response to messages.

1. Collection and Refinement of Check-Ins

In a preferred embodiment, check-ins from social media services such as Facebook, Twitter, Foursquare, Gowalla, Instagram and others are collected and aggregated to provide an interface for location administrators to react with direct local response to patrons or would be patrons.

Data is collected from social media services in multiple ways. For example, the system may poll social media web sites for public check-ins at location-based services such as Foursquare, Gowalla and Yelp. This is explicit check-in since location is part of the data. Many of these services are integrated with another social media site such as Twitter for actual publication of the check-in. In such a case, the system polls that secondary site which provides at minimum the social media content, its author (patron), date and location. As another example, the same type of data minus location may be collected from non-location based social media services such as Twitter, Facebook, Instagram, Path, Foodspotting, etc. Since location is not explicitly part of the data, the system infers location and refines it through various means and then matches it to the patron. This is referred to as implicit check-in. Most social media check-ins are implicit and so this valuable data is not missed.

Implicit check-in may be performed by a combination of key word matching and natural language processing. For example, the system may run hundreds of search terms across its data for a particular location. Locations are pre-indexed with individually customizable search terms. Implicit check-in may also be obtained from data types other than text. For example, photographs may have tags and geolocation data provided by the social media service such that these become searchable. Quality of matches determines whether a piece of social media content is accepted as having veritable location.

Location data is further refined by querying remote services that collect, aggregate and analyze social media content. The exact nature of the remote services may change from time to time as new services arise and others are no longer available or required. However, in general queries to remote services seek to remove false positives in previous steps thus improving data quality.

The result is that the system associates patrons with a veritable location and is able to accurately inform the location administrator about the location's actual patrons.

2. Patron Management

The system allows location administrators access to a dashboard which shows patrons that checked-in to a selected location within a selectable time period. A registered login may be required.

Patrons may be displayed in various manners such as an alphanumeric list or by their public avatars from the social media service from which their check-in originated. Patrons may be ordered by date of check-in, social media that registered the check-in, calculated geographic proximity to the location, etc. such that information is usefully organized.

Details other than check-ins such as patron's public profile gathered from social media services is available and may help determine selection for messaging. Examples include the number of times a patron checked-in to a location, or the number of times a patron was messaged and responded to marketing campaigns. Influence held by the patron in the social media sphere may be obtained directly from the social media service associated with the check-in and include information such as the number of "followers" for the purposes of selecting candidates for messaging.

The displayed data may be enhanced by remote services, the types of which may change from time to time as new services arise and others are no longer available or required. Remote services may include a social influence rating service such as Klout that provides data on patrons to assist determining best candidates in the social media sphere for word of mouth referrals.

While information about patrons is useful from a marketing perspective, the user interface also provides a means for the location administrator to send selected patrons a public reply on a social media service, usually the service where content was authored.

3. Marketing Message and Analytics

The system permits responses to check-ins. Once a set of patrons has been identified, the location administrator may desire to communicate with those patrons. By messaging to selected patrons, it is possible to send a targeted and customizable response. Message sending may be configured for any communicate site or method such as public and private messages on social media services, or direct communications by texting or email. By using the public messaging system of the original social media source, it is possible to send non-intrusive message to the patron and in some cases to would-be patrons. For example, responses via Facebook may be through on the patron's "wall" while messages via Twitter may be public posts using @mention form to direct to the intended recipient. Responses may be a marketing message, offer, electronic coupon or link to further content. The system makes available a number of stock responses or permits a custom message instead.

Quantity of messages can be regulated and configured. For example, rules for rate limiting may stipulate that a patron will never receive more than 1 message per day from all locations entitled to send messages to the patron using the system. In another example, frequency capping may impose the maximum quantity of messages that a single user will get from the same merchant within a time period such as 1 per week. In another example, the location administrator may be limited to no more than 20 messages per day or be provided with a replenishable number of credits for messaging. Patron also may be provided the right to opt-out of receiving messages.

The system provides analytics on the messaging campaign. Analytics may be displayed alphanumerically and/or graphically such as by use of charts. At minimum, the analytics keeps track of to whom a message has been sent, and how many patrons have responded. These analytics may be used as a way of gauging success of a marketing campaign. Analytics may also provide demographic profiles of patrons obtained from original social media service or by remote data services such as Rapleaf which process social media. The exact remote service for analytics may change from time to time as new services arise and others are no longer available or required. Along with demographics, other consumer behavior analytics such as gender, time of day/day of week when checked-in, loyalty (check-in frequency), sentiment, etc. may aid in composing marketing messages and selecting patrons to whom to send it. For example, the message may include a coupon for certain type of drink offered by a bar to a certain patron profile for a certain time of day if, for example, check-ins to locations of that type were found to be popular with or desirable to that patron profile at a certain time of day of the week.

BRIEF DESCRIPTION OF THE DRAWINGS

In the drawings, closely related figures and items have the same number but different alphabetic suffixes. Processes, states, statuses, and databases are named for their respective functions.

FIG. 2B shows general heuristics and transactions between entities in a preferred implementation of the heuristic overview of FIG. 2A. Functional blocks may occur independently once pre-requisites are fulfilled.

FIG. 3B is a flowchart showing a method to match a patron with a location. Typically, this process is a continuation of the process shown in FIG. 3A.

DETAILED DESCRIPTION, INCLUDING THE PREFERRED EMBODIMENT

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

1. System

The system of a preferred embodiment consists of a network, one or more network based servers (computing devices) with a central database, software and input/output, and any number of clients (computing devices) with software and input/output.

Figure 1A:
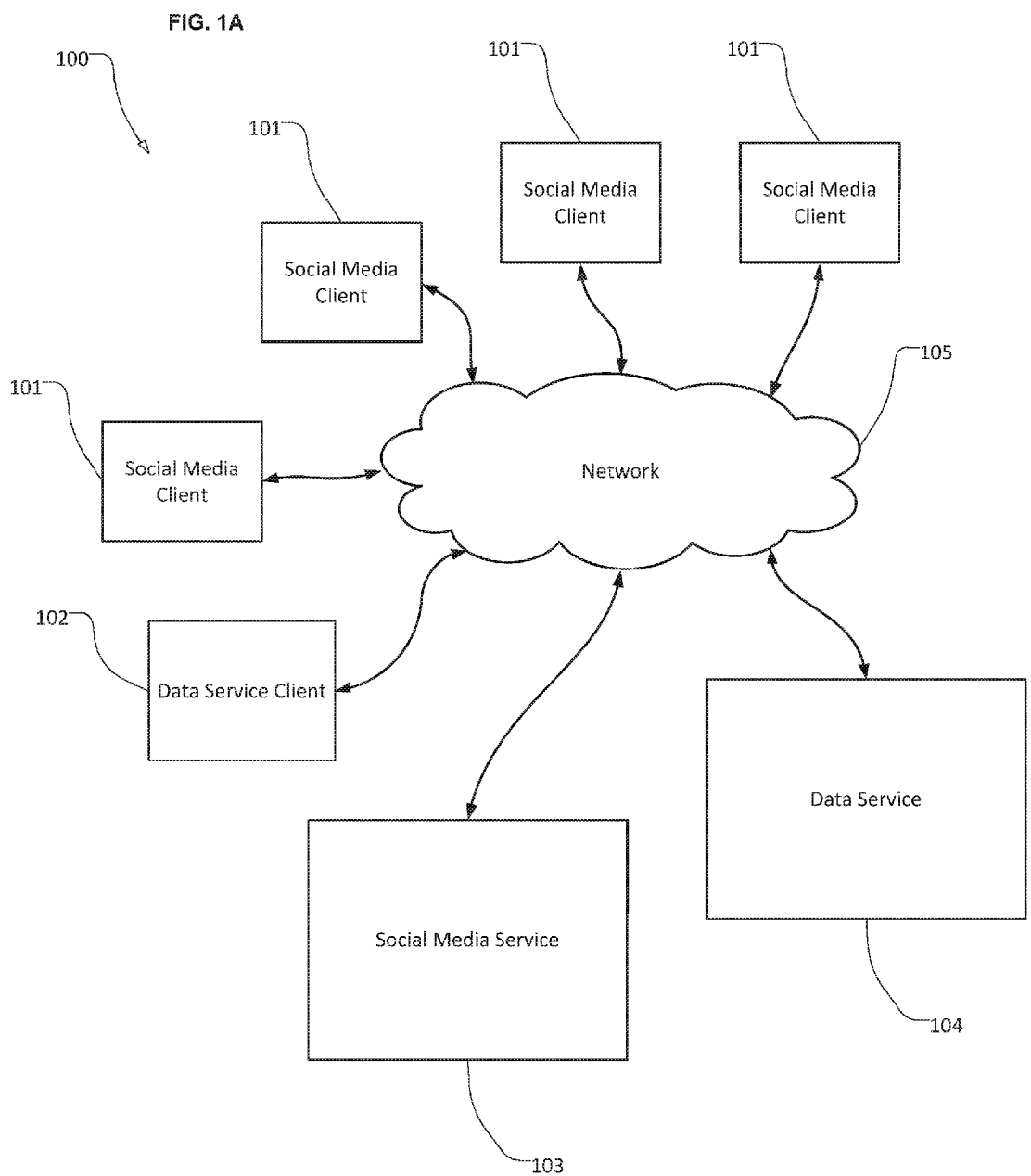
FIG. 1A is a system overview showing the generic physical components of the system.

Referring to FIG. 1A, a generic system overview of entities 100 is illustrated. System 100 is comprised of any number of Social Media Clients 101, any number of Data Service Clients 102, one or more network based servers known as Social Media Service 103, one or more network based servers known as Data Service 104, and network 105. Via network 105 interactions may occur between: Social Media Clients 101 and Social Media Service 103, Data Service Clients 102 and Data Service 104, and Social Media Service 103 and Data Service 104. More specifically, Social Media Service 103 provides raw data to Data Service 104 which processes the raw data and makes it available to Data Service Clients 102. Data Service 104 may also intermediate interactions between Social Media Service 103 and Data Service Clients 102 such as for purposes of reaching Social Media Clients 101, Network 105 may be any of method of connecting Clients and Services. This generic system is the basis of embodiments.

Figure 1B:
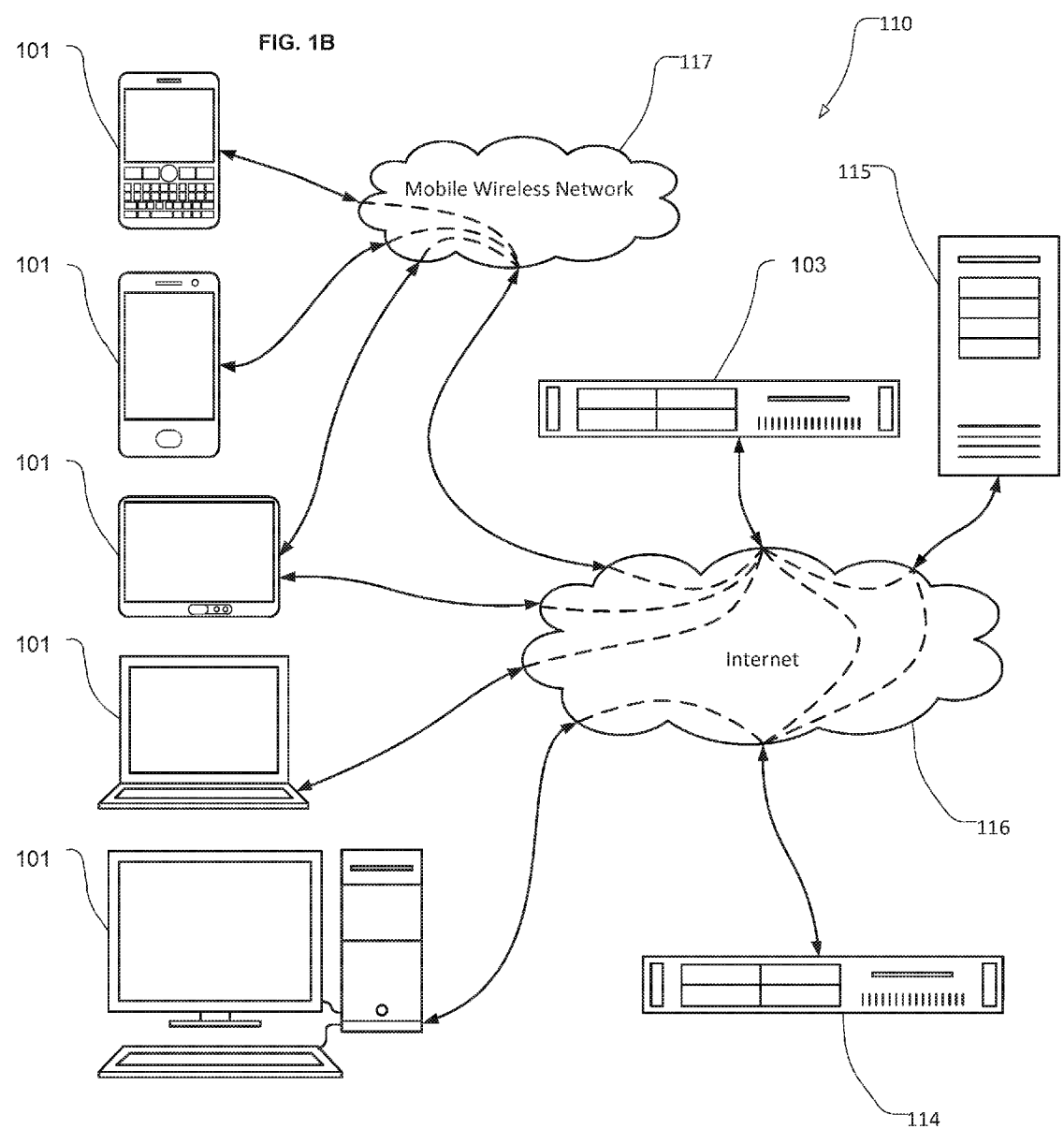
FIG. 1B is a system overview of a preferred embodiment implementation of the generic system overview of FIG. 1A. Types of data services are differentiated and interactions though various networks are specified.

Referring also to FIG. 1B, a preferred embodiment of system 110 is illustrated. This is comprised of any number of Social Media Clients 101, any number of Data Service Clients 102, and one or more Social Media Service(s) 103. Data service 104 is separated into Internal Data Service 114, which may consist of set of distributed servers, and one or more Remote Service(s) 115. Clients and data services communicate with each other through interconnected networks. The network consists of Internet 116 and Mobile Carrier Network 117.

Social Media Clients 101 and Data Server Clients 102 are operated by human users and consist of network connected computing devices such as, but not limited to, desktop or laptop computers, and mobile devices such as tablets and smartphones. Social Media Clients 101 and Social Media Service(s) 103 interact with each other via Internet 116, Mobile Carrier Network 117, or both depending on their capability and user preference if options exist. Data Service Clients 102 and Internal Data Service 114 interact with each other typically by Internet 116 or through an internal network. Internal Data Service 114 interacts with Remote Service(s) 115 and Social Media Service(s) 103 via Internet 116, and Social Media Service(s) and Remote Services(s) may interact with each other via Internet 116.

Social Media Service(s) 103 may be Internet-based sites such as, but not limited to, Twitter, Facebook, Foursquare, Gowalla, Yelp, Instagram, Path, Color, Foodspotting, Flickr, etc. while Remote Service(s) 115 may be a database marketing services as Rapleaf and Klout or other services that augments data from Social Media Service(s) 103, Exact Social Media Service(s) 103 and Remote Services(s) 115 may change from time to time as new services arise and others are no longer available or required. However, the notion that Internal Data Service 114 may utilize external data as necessary remains consistent.

Mobile Carrier Network 117 is alternatively known as variations of "cellular data network", "mobile service provider", etc. It is connected to Internet 116. In a preferred embodiment, all entities are connected to each other directly or indirectly through Internet 116.

Core logic processing may occur in Internal Data Service 114. Thus all other entities are linked to it directly or indirectly.

During operations outside of functioning within the disclosed system, Social Media Clients 101 and Social Media Service(s) 103 interact to accumulate data on the latter. Examples include interactions such as users posting messages to Facebook or Twitter, or checking in a location to Foursquare. Interactions of this type are independent of but a prerequisite for Internal Data Service 114 to make data available to process. Additionally, certain Remote Service(s) 115 also poll, gather and process data from Social Media Service(s) 103 which Internal Data Service 114 may then have available for refinement of its own data processing.

The following protocols may be used for entities to communicate with each over through Internet 116. In the application layer, HTTP or HTTPS is used bi-directionally between Data Service Clients 102 and Internal Data Service 114. In addition to HTTP/HTTPS, other protocols such as RPC and SSH for communications between Social Media Service(s) 103, Remote Service(s) 115, and Internal Data Service 114 are supported depending on requirements of the former two (Internal Data Service 114 is adaptive). TCP/IP is used as the transport and internet layers. Whichever link layer and ports used by the Internal Data Service 114 are such that connection, preferably secure, to Internet 116 is possible.

The Internal Data Service 114 may be hosted on one or more Internet connected servers comprised of a processor, memory, input/output capabilities, operating system, database and server software. Data Service Client 102 is comprised of a processor, memory, input/output capabilities, operating system and a web browser. Details of Social Media Service(s) 103, Remote Service(s) 115 and Clients 101 are beyond scope of explanation except to the extent they have access to Internet 116 by which sessions with Internal Data Service 114 are possible.

The roles of how entities interact will become more apparent in methods of the present invention described herein.

2. Method: Back-End Processing and Administration

Figure 2A:
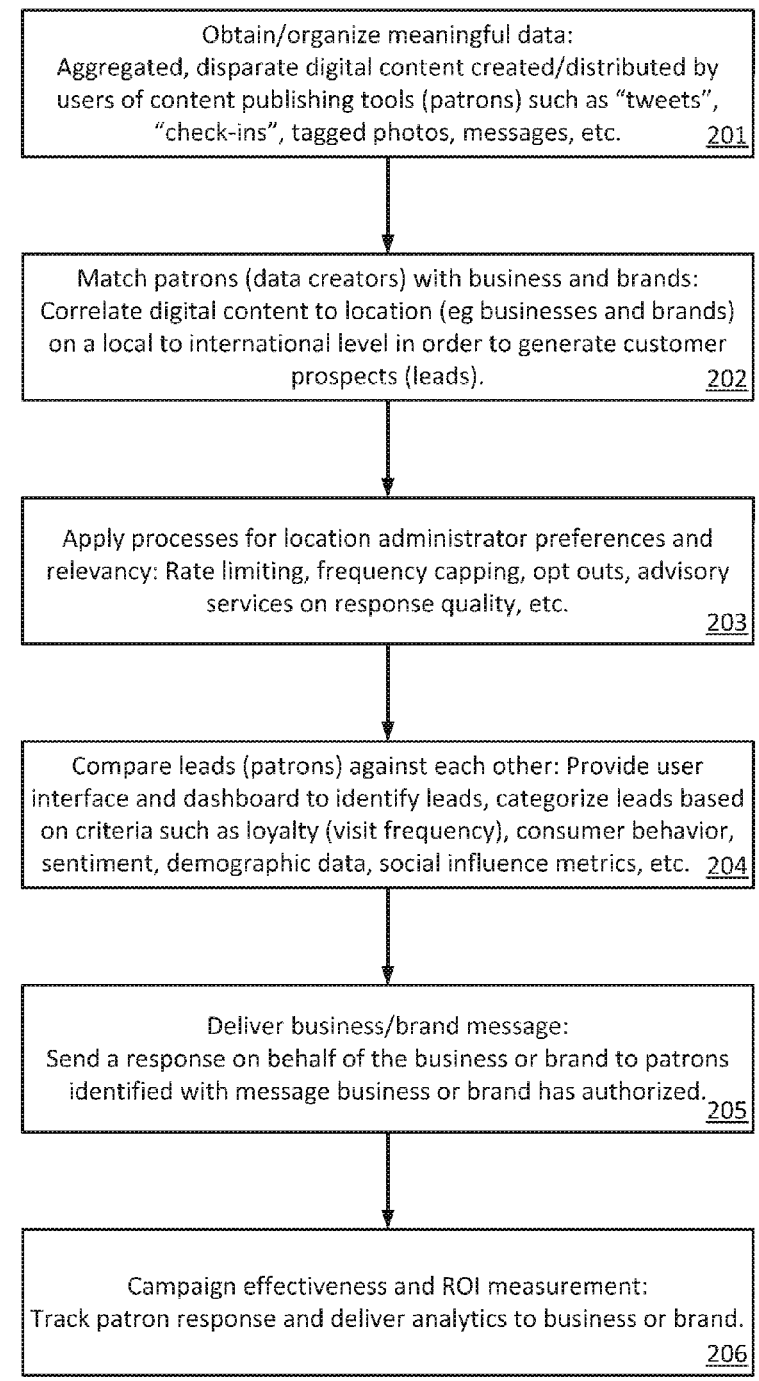
FIG. 2A is a heuristic overview describing what components of FIG. 1A do in terms of major functional blocks. Functional blocks may occur independently once pre-requisites are fulfilled.

Referring also to FIG. 2A, the general heuristics 200 are as follows.

Data in the form of digital content originating from social media services is collected and processed 201. Data type may be in various forms such as text, photographs and other media. Processing converts raw data into data records which can be stored, such as in a database, and reference or link to other data records. The database is designed to accommodate raw data from various original formats. Data elements vary depending on the original source even for the same media type. If a relational database is used, columns are designed to capture all relevant fields. If a document database is used, fields can capture various data types. Data records may include the patron, content, time, and identification of source social media service. It may also include other data, in particular location if available. Patron data includes identification of a way to message back to the patron, such as identification information to direct messages, which may vary by social media service.

Imported data is then further processed to match 202 the patron with a location if not already part of the imported data. This correlates locations with leads (patrons who created or are associated with particular digital content referencing the location). Matching may be provided by the data source where location is already provided, which is called explicit check-in, or it may be inferred, which is called implicit check-in. If explicit check-in, a location tag from data is read and location identified from the tag. If implicit check-in, processing occurs where information is extracted from source media. Information can be extracted by various means including natural language processing of text data, image recognition, and meta-tags such as found in certain types of media.

Once patrons are associated with locations, location administrators may choose to view patron lists by a process that selects for preference and relevancy 203. For example, location administrators may elect to view patrons only from a certain geographical area. Location administrators may elect to view patrons based on quality/likelihood of response, which may separately be calculated by the system. The list may be limited by the system in multiple ways, for example, such that patrons may not be contacted if they have previously been contacted within a configured time window. Patrons also may elect to opt-out of being contacted. Opt-outs may be system-wide (from all messaging) or location-specific (from messages from or about a specific location). This stage modifies which patrons are viewable and/or which are enabled for messaging in a subsequent stage.

The system provides a user interface to manage 204 patrons. Patrons may be displayed in a format that provides an overview with ability to drill down to details of any particular patron at will. Patrons displayed are particular to a chosen location. The interface then enables the next stage, messaging.

The system provides an interface to message 205 patrons. Once patron has been linked to an identifiable location, a message may be created and sent to that patron based on contact information gathered during data collection.

The system may also track 206 effectiveness of messages. For example, patrons to whom a message was sent may be tracked using the same method of 201 and 202 and tabulated and analyzed for check-ins or posts relevant to the sent message. A user interface is provided for such analytics.

The general heuristics described may be implemented in various embodiments.

Referring also to FIG. 2B, an embodiment 210 of the general heuristics 200 is as follows. External Data Service(s) 213 is either Social Media Service(s) 103 or Remote Service(s) 115, or both. Line breaks 214 identify separation of processes. The process may occur sequentially, however they are not necessarily performed immediately successively in the same user session, and as pre-requisites are fulfilled, may occur independently.

In the first stage 221.1, a back-end process of Internal Data Service 114 polls External Data Service(s) 213 though an Application Programming Interface (API) provided by the external data service. In the example shown external data service is Social Media Services(s) 103. In stage 221.2, Internal Data Service 114 receives requested content and, in stage 221.3, aggregated the content into a database designed to accommodate disparate sources. Raw data includes at minimum social media content, content author, social media source and date.

In stage 221.1, social media content may be alternatively fetched from External Data Service(s) 213 using a custom parser or scraper. The custom parser may be a computer-implemented script which examines a web page of the External Data Service for certain keywords and HTML tags. In addition or as an alternative, data may be received on a continual basis, without explicit requests, and parsed for content, author, and date information. This may be performed, for example, by using RSS.

Once raw data is imported from source using any of the above methods, a second back-end process matching 222.1 a social media content author to a location, in particular to a merchant or brand, may occur. If matched, social media content author is recognized as a patron of the location and therefore a possible marketing lead. If data originated from a service that performs explicit check-in, this is location is included with the content and so Internal Data Service 114 may assimilate the location based on a location-identification scheme defined by the service. If the service does not include explicit check-in, Internal Data Service 114 performs a number of tasks for implicit check-ins.

Once check-in is performed, further refinement may be necessary particularly for implicit check-ins to remove false positives as a third back-end process. While the previous stage included verification, this optional stage is performed using external services. Internal Data Service 114 queries 222.2 Remote Service(s) 115 with parameters about the patron. Remote Service(s) 115 perform any requested verification or identification of additional information and returns 222.3 results.

Stages 221.1 to 222.3 may run continuously in the back-end independent of the further processes. Once initially populated, the result is a database of patrons ready to be utilized in the next set of stages.

The following is the process involved with displaying setting preferences and relevancy regarding display of patrons. Parameters include, for example, minimal intervals between allowing messages to a lead, only for patrons whose social media content was publicly posted in a given time interval, or only for those registered to a particular geographic area. Parameters may be set or system administrator configured, such as in a database through an system administrator interface or within source code. The effect of parameters for preference and relevancy 223.1 is manifested in the User Interface (UI) for Data Service Client 102. Parameter effects may be evident wherein the patron may be displayed within the UI but actions such as messaging are disabled or may not be displayed at all according to business rules.

The following is the process involved with displaying patrons. A location administrator using Client 102 may need to establish an account and log in according to business rules. Then, a request 224.1 to obtain a user interface (UI) to query patrons for a particular location is submitted. A UI is returned 224.2. If the location administrator has account rights for multiple locations, the UI may include an input for location selection, in particular a merchant or brand. In 224.3, Client 102 makes a request to Internal Data Service 114 by providing a location. If the location administrator has account rights to a single location, that location may be provided by default without requiring any selection. Internal Data Service 114 returns a user interface 224.4 populated with patrons corresponding to the requested location. Client 102 may then select one or more patrons for additional details 224.5 which may be returned 224.6 by the Internal Data Service 114 unless the data was already included when the UI was rendered in a previous stage.

The following is the process involved with messaging. A location administrator using Client 102 requests a UI for messaging 225.1 by selecting one or more patrons previously displayed in process 224.4 or 224.6 and enabled for receiving messages. The UI for messaging composition 225.3 is displayed if already available on the Client or otherwise downloaded and displayed 225.2. Alternatively, a UI for messaging may be displayed in stage 225.1 and patrons may be selected in stage 225.3. In either case, a composed message is submitted to the Internal Data Service 114 which forwards the request 225.4 to External Data Service(s) 213. Typically this will route the message to the same Social Media Service 103 on which the original social media content was authored. Since the author was part of the data that was originally obtained, External Data Service(s) 213 can properly route the message and return an acknowledgement 225.5 to Internal Data Service 114 which may then send indication 225.6 to Client 102 that the message was sent.

The following is the process involved with analytics. Data Service Client 102 requests a UI for analytics 226.1. Internal Data Service 114 gathers information pertinent to a selected location and/or any locations pertinent to the location administrator using Client 102. Information displayed may include responses to previous messages, number of check-ins to location of interest during a time interval, etc.

Figure 3A:
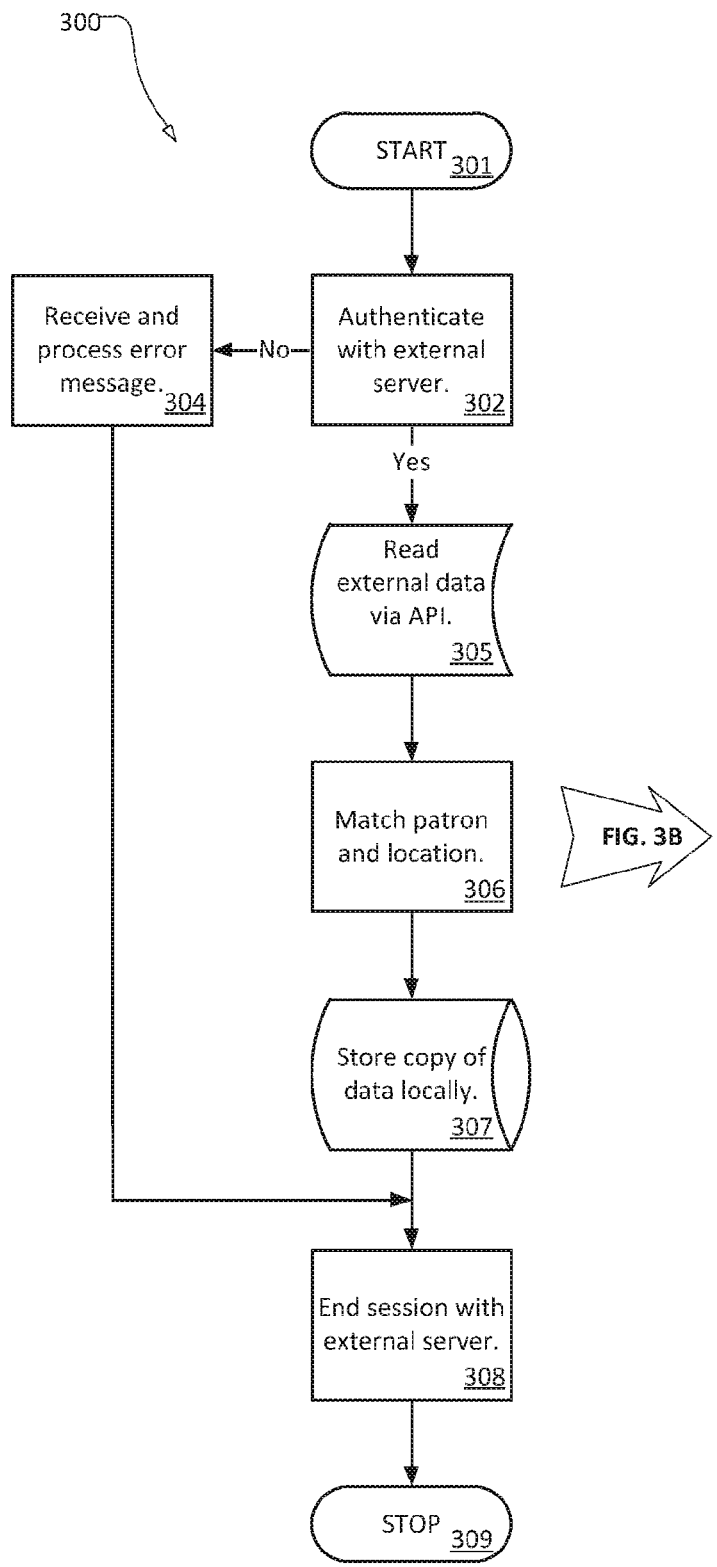
FIG. 3A is a flowchart showing a method for aggregating and organizing social media content. This is a back-end process from the perspective of the Internal Data Service described in FIG. 2B.
Figure 3C:
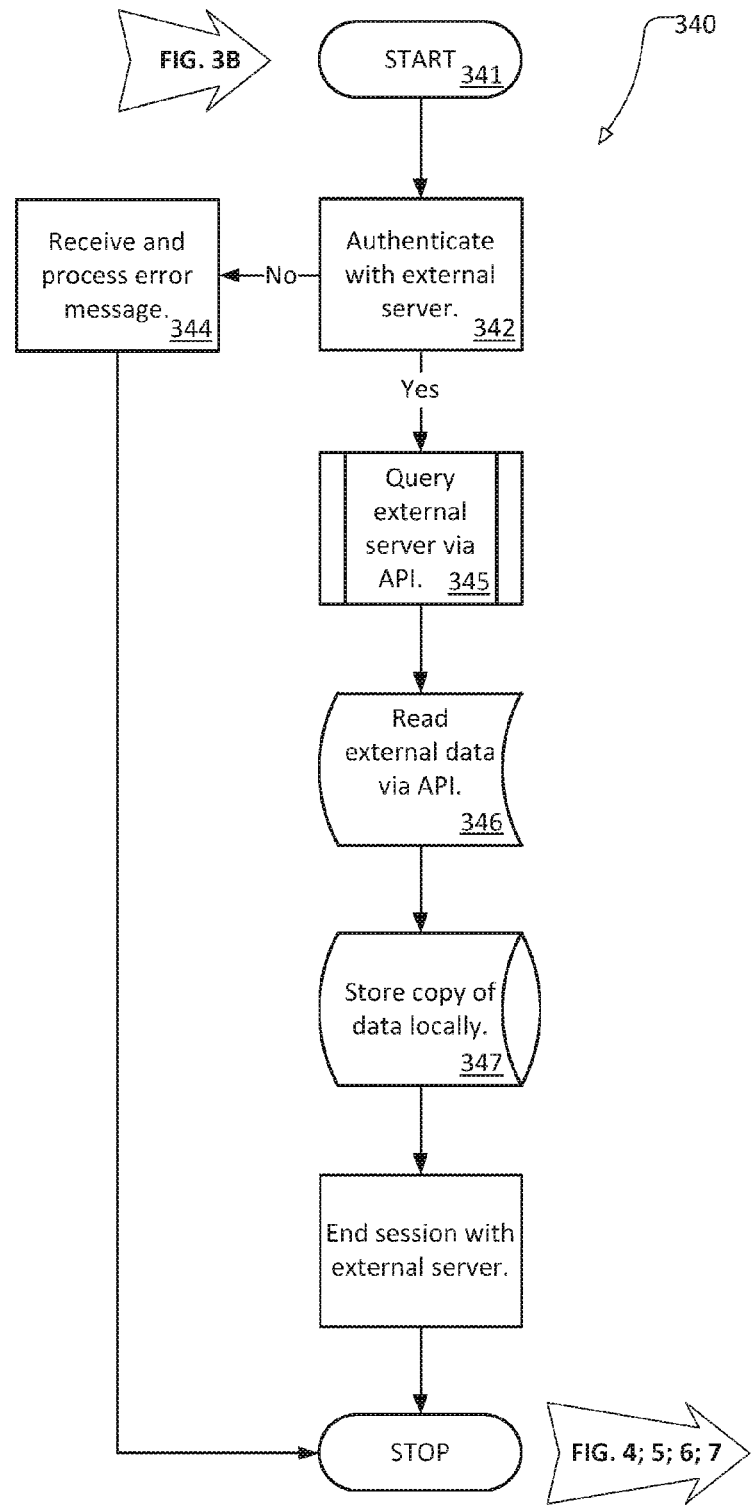
FIG. 3C is a flowchart showing a method to improve matches found in a previous stage by applying heuristics that filter out all but the most relevant matches and removes false positives. Typically, this process is a continuation of the process shown in FIG. 3B.

Referring also to FIGS. 3A, 3B and 3C, interrelated back-end processes normally execute sequentially. At each process, filtration of data occurs to improve its quality.

Method 300 details how Internal Data Service 114 obtains data from External Data Service(s) 213. Execution may be initiated 301 on scheduled or continuing basis. The first step is to attempt authentication 302 with an external data service. If not authenticated, an error message is returned 304 and execution stops 308 before further actions to resolve the problem. If authenticated, data can be queried and read through APIs provided 305 by the external data service. A query is made for records on External Data Service(s) 213 containing matching key words in any tags associated with any particular record. Key words are pre-indexed location names in the database of Internal Data Service 114. Pre-indexing is done to seed location names in the system. New locations, such as locations identified through explicit check-ins or based on implicit check-ins which don't match known locations, may be automatically added or flagged for system administrator review and added upon approval to the pre-indexed location names list. Spelling variations are taken into account. A matching record undergoes analysis for check-in which consists of matching 306 a social media content author to a location. For all matching records, data is stored 307 and made available for further processing. Data records that are not matched may also be stored for additional processing, such as location matching through association with other patrons, or for future review. Any open session with the external data service is ended 308. Execution does not necessarily stop 309 if there are more than one external data services. Periodically, the cycle starts again if sessions are scheduled and not simultaneously continuous with all external data services.

Processing 320 of check-ins commences 321 when data is matched 306. A data record is read 322 from the database or otherwise accessed. A check-in type is determined 323 for the record. Certain Social Media Service(s) 103 are known to supply check-ins with location tags and thus known to be explicit check-ins. If check-in is explicit, the location portion of the data record may be retrieved. Different schemes may be used by different social media services for explicit identification, such as by name or by an identifying id number, but the location portion may be cross-referenced against any such scheme to identify the specific location. The processed location data may be stored 328 in the database, creating a reference between the patron and location at the date or time associated with the data record. Unless all records are processed 329, another unprocessed record may be accessed and the same operation is performed. If check-in is implicit, the process is more involved. A check of data type is performed 324 on the data record. Depending on the data type, different processes may be applied. If the data record is text, natural language processing 326 is performed. For other media data types, photographs, video and audio in particular, meta-data processing 325 is performed. Social Media Service(s) 103 may supply metatags associated with the media data. Tags may contain text information upon which natural langue processing 326 is applied as is the case with social media content that is natively text. The result then undergoes parsing 327 whereupon location information is stored 328 to the database. Once written, further refinement may follow. A check is performed to determine if there are further records to be processed. If so, another unprocessed record may be accessed and the process re-iterated.

Further elaborating on the natural language processing 326 of text, a search is made for key words within the text. Processing includes Boolean logic for key words or phrases such as "am at," "am leaving," "going to," "having lunch at," and similar statements which imply a patron's presence at a location (current, historical, or future). Phases lacking certainty such as "I wish I was at" or "I want to go to" may be deemed not to be matches and thus ignored as implicit check-ins. Key words and phrases may be pre-indexed in a modifiable list by a system administrator. Text following such phrases (or preceding, based on the keyword or phrase) may be treated as a location tag and extracted, and may then be checked against known locations to identify if a location was specified. Identified variations in tag values may be filtered for spelling variations by use of a list of equivalent variations. For example, if a location in the database of Internal Data Service 114 is spelled "Burgers and Shakes" but location obtained from External Data Service(s) is "hamburgers n shakes," the latter may be considered a match based on equivalent variations. Locations may be configured to have required words or words which may not vary. For example, the "hamburgers n shakes" data record would not match "Burgers and Shakes Museum" if "Museum" was marked as required or no variations allowed. The rules to accept or reject variations may be configured at a location level by location administrators or at a system level by system administrators.

If a location is not directly identifiable, the location may still be identifiable through other associations. For example, the data record may be a post from patron A on a social media service stating "Going out with Michael." Social mapping may not possible directly within any single social media service, nor directly through A's postings. But by parsing natural language, identifying patrons such as "Michael" with accounts and check-ins across many social media services, and correlating time information, location of A may be determinable by cross referencing shared presence with other patrons who have their own location identified. If a correlating patron referenced in the data record is found, in the example case "Michael," with a known location within a time period relevant to the data record, then that known location may be applied to the data record.

Further to analysis of media data types, geotags (latitude and longitude but not specifically the location to which they apply) may be utilized to determine a location. In many cases, photographs taken with devices that have an integrated GPS will contain this extractable information. Geolocation may be supplied by the social media service to which, for example, photographs with geotag information are uploaded. External Data Service(s) 213 may return geotags of a photograph. Internal Data Service 114 may parse such geotags and extract available information to aid in matching by cross referencing the information to locations in its database. If a patron is associated with the picture, such as the taker of the picture or identified as being a subject within the picture, the data record associated with geotagged media may associate a patron with a location. Similar to geotags, photos often include further metadata such as a date or timestamp the picture was taken. Such date or time information may similarly be extracted and associated with the data record.

Execution of additional filtration 340 to improve matching may be initiated 341 when a check-in is processed and stored to the database. A first step is to attempt authentication 342 with Remote Service(s) 115, If not authenticated, an error message is returned 344 and filtration stops 349 to allow further actions to resolve the problem. If authenticated, Remote Service(s) 115 is queried 345. The query sent includes identification of a Social Media Client 101 and information about the check-in. The query may also contain the nature of information sought such as user habits in an attempt to remove false positives by estimating probability of a match. Data is returned 346 and stored 347 locally in the database.

3. Method: Use Cases and User Interface

Figure 4:
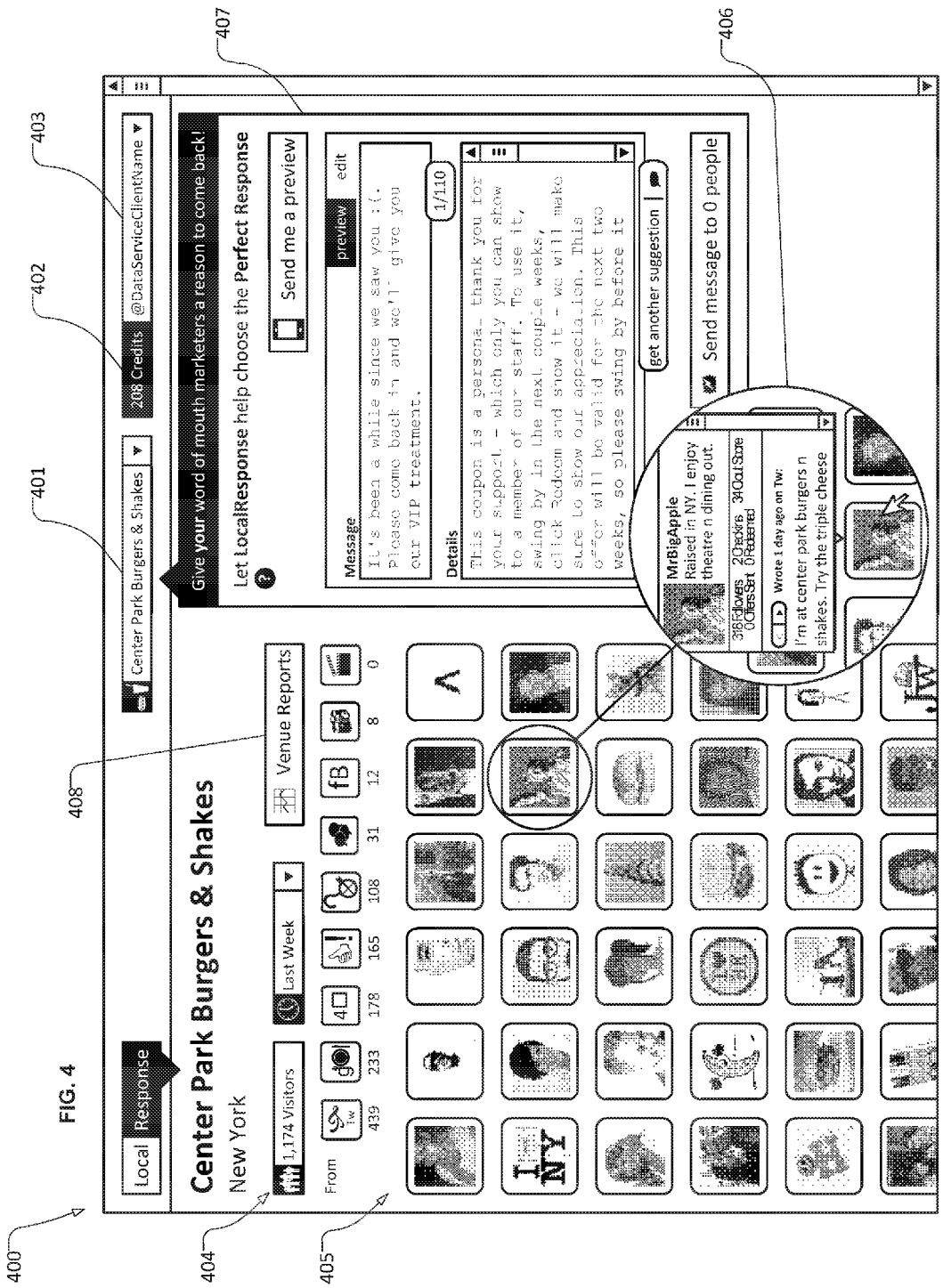
FIG. 4 shows a user interface of a preferred embodiment wherein details of patrons are displayed.

Referring also to FIG. 4, a user interface displays details of patrons. User interface 400 may be rendered as a web page or within an application, and is used by a location administrator operating Data Services Client 102 consisting of three main sections: location selection and user account information, list of patrons, and messaging panel.

Location selection 401, a selection control such as a drop down list, permits location administration of more than one location. As an additional option which may be enabled/disabled on a system or location level, location administrators may be enabled to select related or competing locations. For example, location administrators for a brand may be enabled to select a competing brand and thereby access lists of patrons of the competing brand. Credits 402 refer to the number of messages that may be sent by the current location administrator. Credits for sending messages may be replenished daily, dynamically updated, and depend on preferences and relevancy. Credits may be configured at a system level, applied to location administrator accounts, and vary based on business rules. For example all locations may get the same number of daily credits. Alternatively or additionally, credits may be configured as a premium option with levels of subscription or purchase affecting how many credits are available. Alternatively or additionally, locations may get daily credits based on the number of patrons associated with each location. Alternatively or additionally, locations may see daily credit amounts increased or decreased based on response percentage to messages sent, or based on opt-out percentage of patrons receiving messages. The login name 403 of the location administrator may be displayed to provide account control such as viewing account information or logging out.

The patron display includes a statistical overview 404 of patrons for the location within a specified time period. Time periods may be specific hours, days, weeks, months, years, forever, or specified ranges or such periods. This section may include elements such as: a date or time period selection control, which upon selection updates the displayed patrons and number of patrons; statistical information such as the total number of patrons; and a set of icons indicating contributing social media sources for the identified patrons within the specified time period. An individual patron display 405 may show individual patrons who checked-in at least once at the location within the specified time period. The display may be in various forms such as an text list or public avatars accessible through the social media service from which a patron check-in originated. Patrons may be ordered by name, date of check-in, social media source, geolocation of the patron, etc. When patrons are selected or highlighted, such as upon mouse-over, mouse-hover, or mouse-click, details 406 may be shown of the selected patron. Details may include a public profile gathered from social media services, number of times checked-in to the current location, number of times messaged to marketing campaigns and any resulting responses, influence held by the patron in the social media as a score or rating by number of "followers" and/or otherwise scored from Remote Service(s) 115, and recent public social media messages.

A messaging area 407 may be included to compose messages, and links or control 408 may be included to access analytics.

Figure 5:
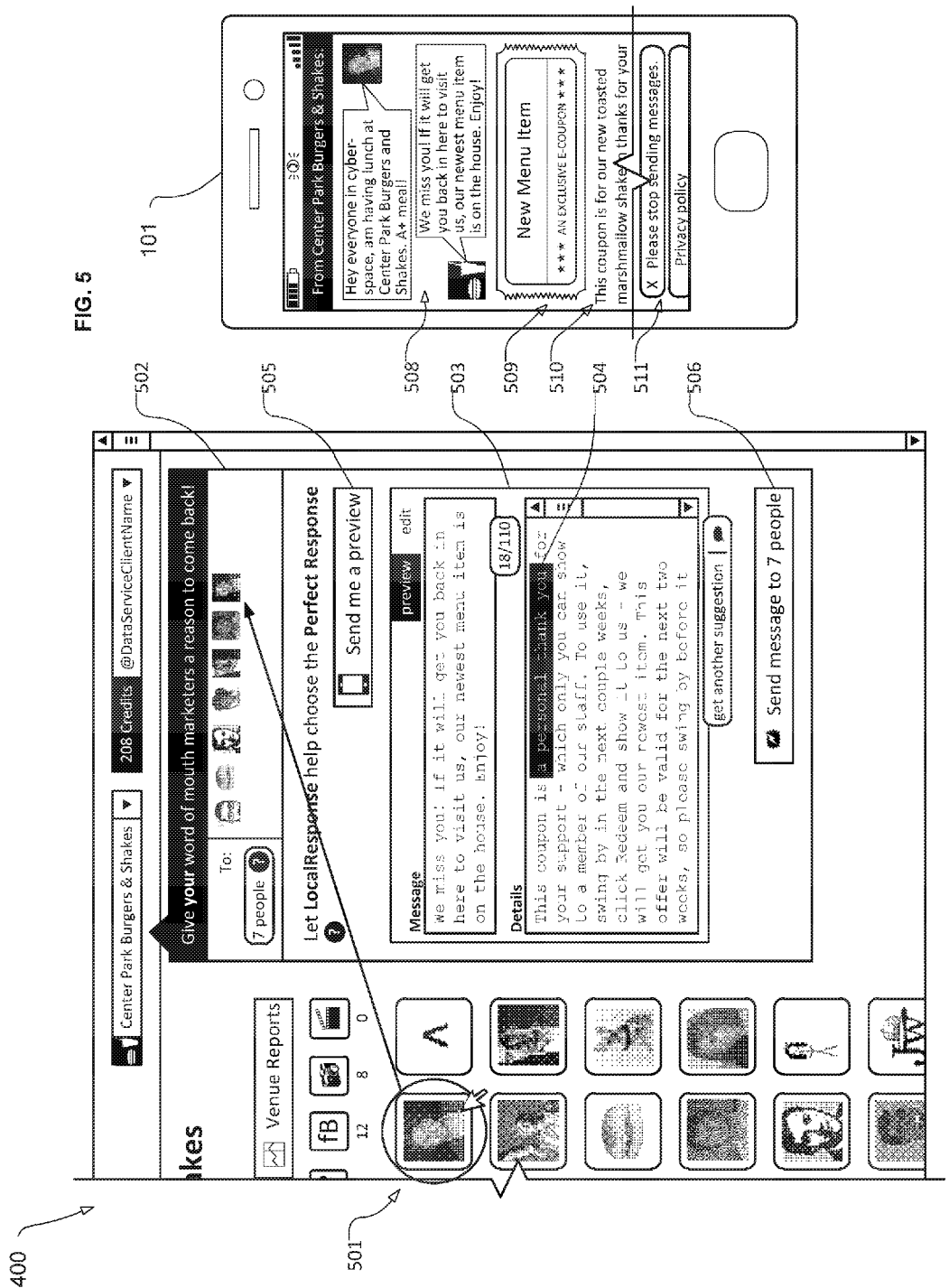
FIG. 5 shows a user interface of a preferred embodiment wherein a message is composed.

Referring also to FIG. 5, a message composed and sent through interface 400 may be received and viewed on data services client 101. In response to check-ins, the location administrator may select patrons 501 within the user interface for messaging. Selected patrons may be displayed in list 502 or other grouped display. In relation to preferences/relevancy, the number of patrons may be limited or selection of certain patrons may be transiently disabled, such as for patrons who have opted out from receiving messages or already reached system-wide messaging limits. In a message panel, the location administrator may select from a set of generic stock messages, a set of customized stock messages, a user-altered stock response 504, or manually input a message. Messaging may include both a short message and longer details, both of which may be edited. A preview 505 may displayed or sent to a data services client 101 of the location administrator. Sending a preview to a data services client may be preferable to viewing the message in the built-in preview mode as, for example, the location administrator may wish to see a device specific output. Control 506 is provided to send the message to selected patron list.

Upon sending to the list of selected patrons, a process as described in stages 225.4 to 225.6 is invoked. In a preferred embodiment, a short message is sent to selected each patrons' public messaging system on a Social Media Service 103 associated with the patron's relevant check-in. The short message may contain a link to a web page containing the longer details. The web page may be hosted or mediated by Internal Data Service 114.

There may be a number of sections displayed along with the displayed message. As rendered on social media client 101, the patron's latest public message(s) about the location may be displayed 508 along with the short message. If applicable, an electronic coupon 509 may be displayed, applicability depending on the stock message type selected or if a coupon was added during the message creation. Longer details may also be displayed 510. Additional standard or default information 511, such as disclaimers, privacy policy, and controls to opt-out of further receiving messages may also be included.

Figure 6:
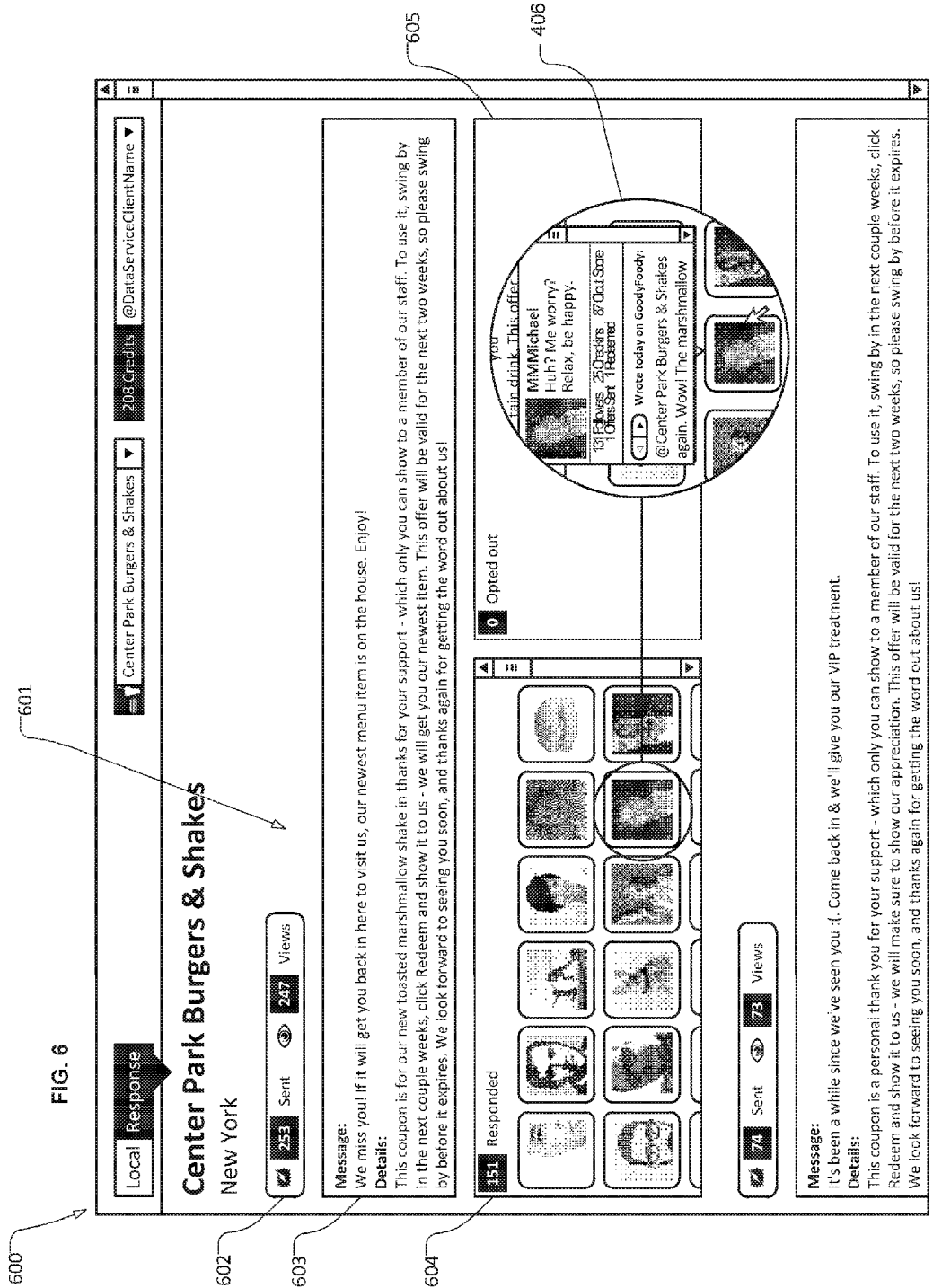
FIG. 6 shows a user interface of the preferred embodiment wherein analytics are displayed.

Referring also to FIG. 6, an interface may be provided 226.2 for analytics. User interface 600 may be rendered as a web page or within an application, and used by a location administrator. One possible access point to the analytics display is through control 408 in the UI for displaying patrons. Analytics UI 600 may comprise repeating sections for each message that was sent for location 601. Each message section may display statistics 602 for number of messages sent to and viewed by patrons, a copy 603 of the message sent, a list 604 or other display of patrons who reacted favorably to the message such as by redeeming a coupon distributed with the message, and a list 605 or other display of patrons who opted out of future messages in response to receiving the message. As in patron UI 400, details 406 of individual patrons may displayed when selected or highlighted such as upon mouse-over, mouse-hover, or mouse-click.

In an alternative embodiment, user interfaces may be provided by a dedicated application for a specific operating system or device such as smartphones.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A method for delivering targeted marketing messages to location-specific patrons, comprising the steps of:
   importing public digital content from one or more social media services across a network to an internal data service operating on a computer server;
   processing, by the internal data service, the public digital content for identification of patron, location, and date;
   maintaining data records of the processed public digital content having such identification;
   providing, to a location administrator using a data service client on a computing device network connected to the internal data service, identified patrons of a location selected by the location administrator;
   sending a message from the data service client to one or more of the identified patrons; and
   analyzing, by the internal data service, response to the sent message.

2. The method of claim 1, wherein processing further comprises separating public digital content into explicit check-ins and implicit check-ins based on a source social media service for the content.

3. The method of claim 2, further comprising for the data record of an explicit check-in, the internal data service:
   retrieving a location portion of the data record; and
   identifying a location based on the location portion and a location identifying scheme specific to the source social media service.

4. The method of claim 2, further comprising for the data record of an implicit check-in, the internal data service:
   identifying a data type of the data record;
   applying natural language processing to any text data; and
   applying meta-tag processing to any media data.

5. The method of claim 4, wherein applying natural language processing further comprises:
   searching the text data for matches with keywords or phrases which identify the data record as lacking location certainty;
   if the data record does not lack location certainty, searching the text data for matches with keywords or phrases which identify location;
   based on a matched keyword or phrase, extracting a location tag from the text data; and comparing the extracted location tag with known locations and associating a matched location with the data record if matched.

6. The method of claim 5, wherein comparing the extracted location tag further comprises comparing with acceptable spelling variations of each location, and associating the matched location if a match occurs with an acceptable spelling variation.

7. The method of claim 5, further comprising if the data record does not lack location certainty and does not match a location, the internal data service:
- searching the text data for identification of association with any other patrons;
- if a matching other patron is found, searching other data records for location of the other patron at the date of the data record;
- if a matching location is found for the other patron, associating the matching location with the data record.

8. The method of claim 4, wherein applying meta-tag processing further comprises:
- extracting meta-tags associated with the media data;
- if geo-tag information is included in the meta-tags, matching a location based on geo-tag information and global positioning coordinates associated with locations tracked by the internal data service; and
- if date or time information is included in the meta-tags, updating a date associated with the data record to the date or time information from the meta-tags.

9. The method of claim 4, further comprising querying a remote service for verification about the implicit check-in.

10. The method of claim 4, wherein providing identified patrons further comprises:
- displaying, within a user interface rendered on the data service client, a sortable and selectable ordering of patrons of the location.

11. The method of claim 10, wherein sending a message further comprises:
- selecting one or more of the patrons displayed within the user interface;
- composing the message within the user interface; and
- transmitting, for each of the one or more patrons, the message from the data service client through the internal data service to a social media service used by the patron and addressed to the patron as defined by the social media service.

12. The method of claim 11, wherein composing the message further comprises selecting a stock message, modifying a selected stock message, or composing a customized message.

13. The method of claim 12, wherein composing the message further comprises composing a short message, including an optional coupon, and composing a long details, and the transmitted message includes the short message and a link to a webpage containing the long details, optional coupon, and option to opt-out of receiving future messages.

14. The method of claim 13, further comprising applying, by the internal data service, limits on the number of messages sent.

15. The method of claim 14, wherein applying limits further comprises applying, at a patron level, a limit to the number of messages sent to a patron within a time period.

16. The method of claim 14, wherein applying limits further comprises applying, at a location level, a limit to the number of messages the location administrator may send within a time period.

17. The method of claim 14, wherein analyzing patron response further comprises:
- tracking as positive responses access by patrons to the message coupon or link to long details; and
- tracking as negative responses selection by patrons to opt-out from receiving messages in response to the message.

18. The method of claim 17, further comprising altering limits applied to message sending based on the positive and negative responses to messages sent by the location administrator.

19. The method of claim 17, wherein displaying further comprises displaying analyzed results of message sending viewable by message or by patron recipient.

* * * * *